H. H. WEST.
CIRCULAR KNITTING MACHINE.
APPLICATION FILED APR. 6, 1914.

1,117,937.

Patented Nov. 17, 1914.
8 SHEETS—SHEET 1.

Witnesses
C. Clemenba
H. Woodard

Inventor
Harry H. West
By H. B. Willson & Co
Attorney

H. H. WEST.
CIRCULAR KNITTING MACHINE.
APPLICATION FILED APR. 6, 1914.

1,117,937.

Patented Nov. 17, 1914.
8 SHEETS—SHEET 3.

Witnesses

Inventor
Harry H. West

H. H. WEST.
CIRCULAR KNITTING MACHINE.
APPLICATION FILED APR. 6, 1914.

1,117,937.

Patented Nov. 17, 1914.
8 SHEETS—SHEET 4.

Fig. 4

Witnesses
C. Claunter
H. Woodard

Inventor
Harry H. West
By 
Attorneys

H. H. WEST.
CIRCULAR KNITTING MACHINE.
APPLICATION FILED APR. 6, 1914.

1,117,937.

Patented Nov. 17, 1914.
8 SHEETS—SHEET 5.

H. H. WEST.
CIRCULAR KNITTING MACHINE.
APPLICATION FILED APR. 6, 1914.

1,117,937.

Patented Nov. 17, 1914.

Witnesses

Inventor
Harry H. West
By H. B. Willson & Co.
Attorneys

UNITED STATES PATENT OFFICE.

HARRY H. WEST, OF PLYMOUTH, PENNSYLVANIA.

CIRCULAR-KNITTING MACHINE.

1,117,937.　　　　　　Specification of Letters Patent.　　Patented Nov. 17, 1914.

Application filed April 6, 1914. Serial No. 829,935.

*To all whom it may concern:*

Be it known that I, HARRY H. WEST, a citizen of the United States, residing at Plymouth, in the county of Luzerne and State of Pennsylvania, have invented certain new and useful Improvements in Circular-Knitting Machines; and I do declare the following to be a full, clear, and exact description of the invention, such as will enable others skilled in the art to which it appertains to make and use the same.

This invention relates to improvements in circular knitting machines of the class especially constructed and adapted for knitting seamless stockings and socks.

The principal object of the invention is to provide simple and efficient mechanism for producing a stocking or sock which perfectly fits the foot and ankle without either stretching or wrinkling.

Another object is to provide a plurality of needle bits or jacks operable at predetermined intervals to elevate into the non-working level certain needles prior to the narrowing for the toe.

Another object is to provide an automatically controlled cam for coöperation with said jacks to throw out of operation at predetermined intervals a plurality of short butt needles.

The hosiery in use at the present day is so constructed that when worn on the human foot, it is stretched at the heel and wrinkled at the instep to accommodate the foot, and to avoid the wrinkles at the instep, the stocking must be pulled up abnormally tight, thereby producing strain on the material at the heel and at the instep which renders the best yarn frayable under slight wear.

This invention comprehends certain improvements which are especially applicable to what is known to the trade as the "Banner Knitting Machine," the general construction of which is shown in United States Patent to Hemphill, No. 933,443, dated September 7, 1909, and by these improvements the disadvantages of the ordinary stocking above pointed out are overcome and a stocking produced which will perfectly fit the human foot without stretching or wrinkling. This Hemphill patent mentioned above has reference to circular knitting machines for knitting stockings and socks in which the knitting is performed by a circular series or column of needles which are moved up and down in vertical grooves in the needle cylinder under the action of the knitting cams on the cam cylinder which inclose the needle cylinder. The knitting of the tubular portion of the work forming the leg and foot is performed in continuous circular courses by all of the needles and with continuous rotary motion of the needle cylinder, the pouch knitting or fashioning for the formation of the heel and toe being performed in arc-shaped courses by part of the needles under a reciprocatory motion of the needle cylinder.

Such parts only of the machine as may be necessary to show the connection and operation of the attachments for carrying out this invention will be illustrated herein.

With these and other objects in view, the invention consists of certain novel features of construction, and the combination and arrangement of parts as will be more fully described and claimed.

In the accompanying drawings.

Figure 1:
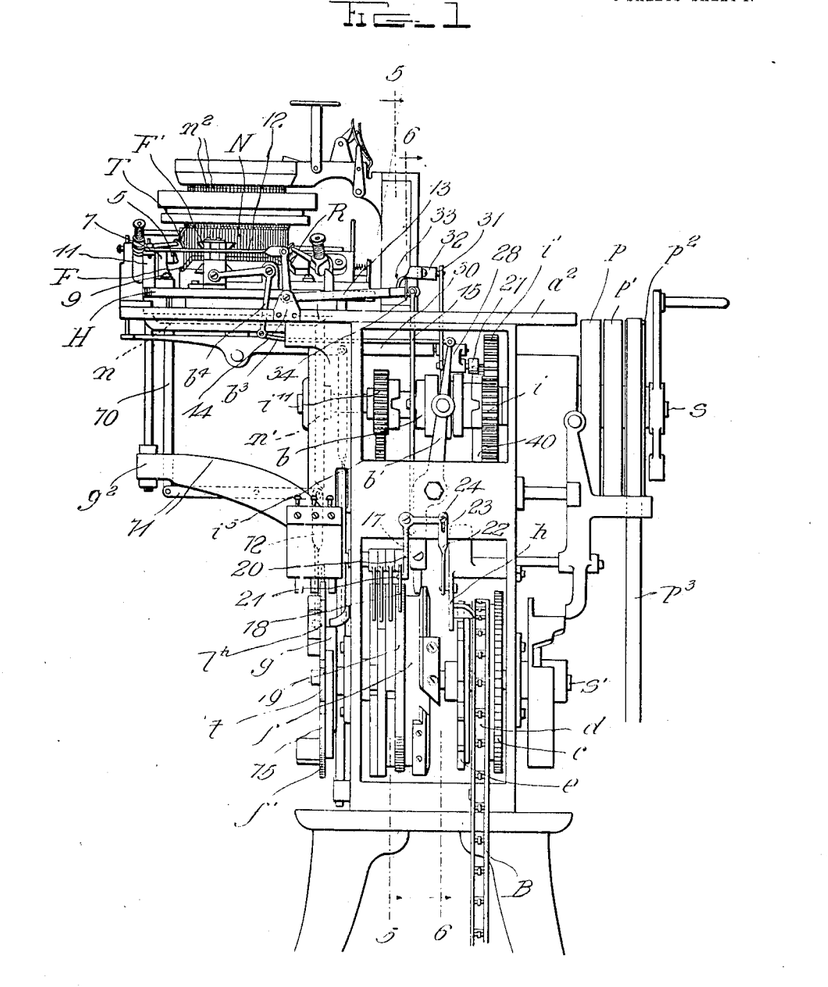
—Figure 1 represents a front elevation of a knitting machine constructed in accordance with this invention.

The drawings show the main instrumentalities of a knitting machine to which the present invention may be applied as comprising a tubular rotary needle cylinder N having a horizontal bevel gear $n$ secured to its lower end with which the driving gear $n'$ meshes as shown in dotted lines in Fig. 1. The mechanism for driving these gears which is clearly shown in Figs. 3, 4 and 28 of the patent above referred to includes a main drive shaft $s$ carrying what will be termed fast, slow and loose pulleys $p$, $p'$ and $p^2$ on which a belt $p^3$ is adapted to be shifted automatically to vary the speed of the machine for knitting the different parts of the hose as is readily understood by those skilled in the art.

A clutch member or hub $b$ is keyed to slide on the shaft $s$ and is provided with a peripheral groove for engagement by an operating or shifting lever $b'$ fulcrumed intermediately of its ends on the frame of the machine. This clutch is adapted to be moved either to the right or to the left to engage either the gear $i$ or the gear $i^{11}$ loosely mounted on the shaft $s$ wherein certain parts hereinafter described will be operated.

Operatively connected with the gear $i$ is an arrangement of gears (not shown) which forms a combined speed gear and when the clutch $b$ is engaged with the gear $i$ and the belt is shifted onto the fast pulley, the shaft $s$ will be rapidly rotated and through the gears $n$ and $n'$ will rapidly revolve the needle cylinder N during the continuous rotary knitting.

The needle cylinder N is provided in its peripheral portion with uniformly spaced longitudinal grooves to receive the circular series of independent needles $n^2$ of different forms, distinguished one from the others by the difference in the length of their laterally extending studs whereby they may be actuated by different needle controlling mechanism for different purposes. In the present embodiment about one-third, more or less, of the total number of the needles have long butts and the remainder have short butts for a purpose to be described. A cam plate H is bored to receive the revoluble needle cylinder and is located above and contiguous to the gear $n$ and carries the main knitting or needle operating cams and the narrowing picks which are brought into action during the knitting of the stocking. A non-revoluble needle supporting cam M practically surrounds the lower part of the needle cylinder and is secured to said cam plate H and is adapted to support the active needles at their normal lower level, while circular knitting is being produced.

The shaft $s'$ on which the speed and yarn changing cams, etc., are mounted makes one complete revolution during the production of each stocking or piece of knitted work and is intermittently rotated by mechanism which may be described substantially as follows: A fine toothed wheel $c$ and chain carrying sprocket $d$ are intermittently revoluble in unison on the shaft $s'$ by means of a positively reciprocating suitable feed pawl $i^4$ which takes its movements from the continuously revolving gear wheel $i'$ through the pitman $i^2$ and arm $i^3$ of a pivoted rocking bell crank lever, the long arm $i^5$ of which has a segment-shaped free end with gear teeth in its periphery which are in continuous working engagement with the loosely mounted spur gear $i^{11}$ to drive it in a rotary reciprocating manner. A coarse ratchet toothed cam wheel $e$ is fixed to the shaft $s'$ and is adapted to be rotated at varying intervals by a swinging pawl $h^8$ movable back and forth in unison with said pawl $i^4$. The pattern chain B carried by the sprocket wheel $d$ is composed of a suitable number of connected links and is provided with a predetermined number of properly disposed and shaped lugs.

Figure 5:
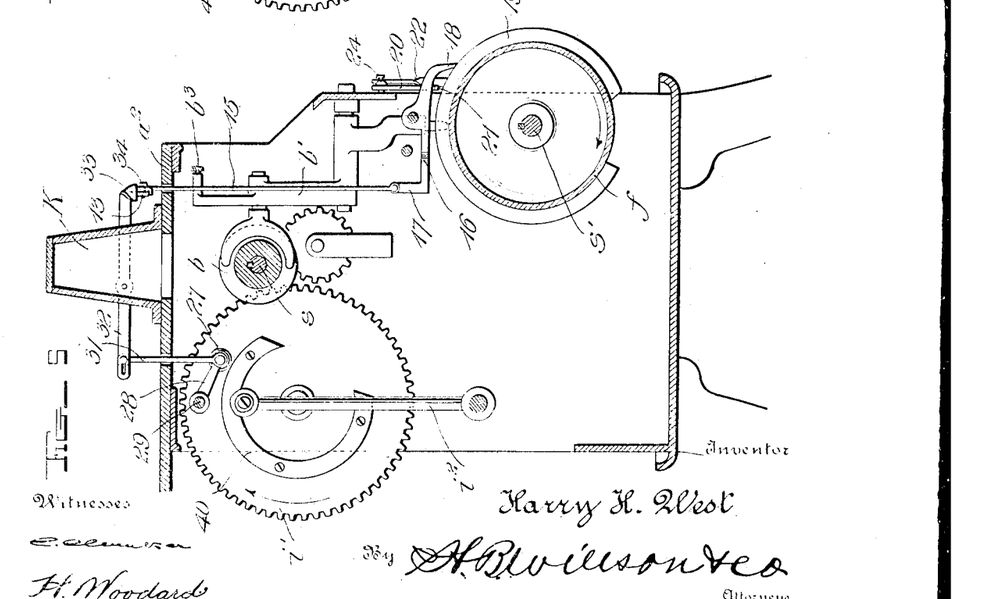
Fig. 5 is a vertical section taken substantially on the line 5—5 of Fig. 1.
Figure 6:
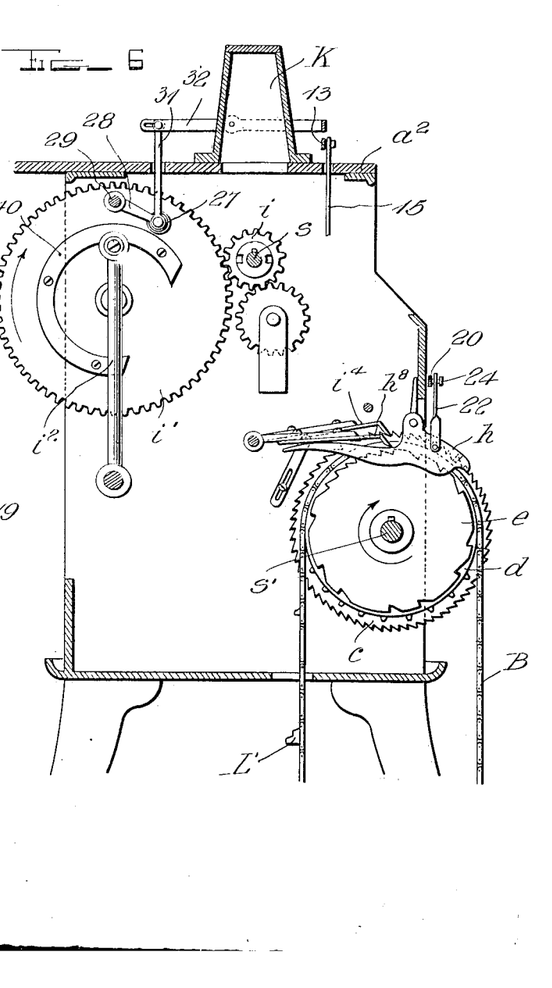
Fig. 6 is a similar view taken on the line 6—6 of Fig. 1.

Intergearing with, located at the back of and actuated by the continuous revoluble small gear $i$ which turns in one direction only is suitably mounted the large gear $i'$ (see Figs. 5, 6 and 7) with which the pitman $i^2$ is jointed. The action of the slow speed pulley $p$ keyed to the gear $i$ operates by means of gear $i'$, segment $i^5$, gear $i^{11}$, etc., to rotate the shaft $s$ and the cylinder N back and forth when the clutch hub $b$ is shifted to the left and interlocked with the gear $i^{11}$ and said last named gear revolves the shaft $s$ whereby its speed ratio is greatly reduced, and this motion of the shaft occurs during the knitting of the heel and toe portions of the stocking and the rapid rotation thereof during the circular knitting for forming the tubular work. The cam drum $f$ and cam $g$ fully described in the patent above referred to are also mounted on this shaft $s$ which is also adapted for controlling the draw cam in a manner hereinafter to be described.

Mounted on the cam plate H are the instep raise and draw cams F and F' which are controlled by the clutch shifting lever $b'$ through the link $b^3$ and a bell crank lever $b^4$ connected with said instep cams as is clearly shown in Fig. 1 of the drawings.

Figure 15:
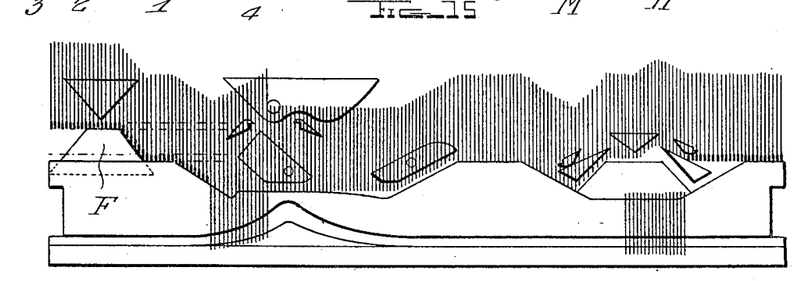
Fig. 15 is a similar view with the long butt needles being raised into the upper or non-working level by the instep raise cam when the clutch is shifted to the left and when the machine is passing onto the heel, and the draw cam shown in operative position.
Figure 16:
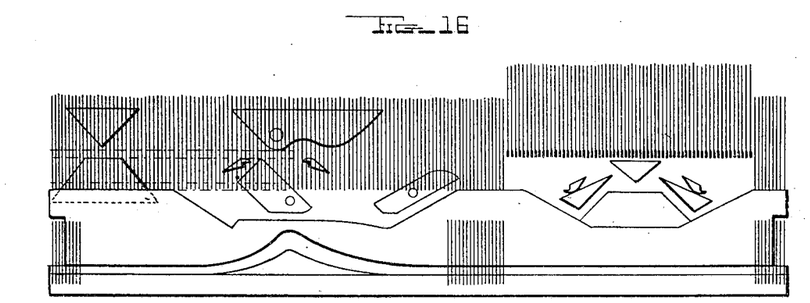
Fig. 16 is a similar view with the long butt needles in raised inoperative position ready for the narrowing for the heel now commencing, with the cylinder at its extreme forward stroke, both the draw and raise cams being disposed in inoperative position.
Figure 17:
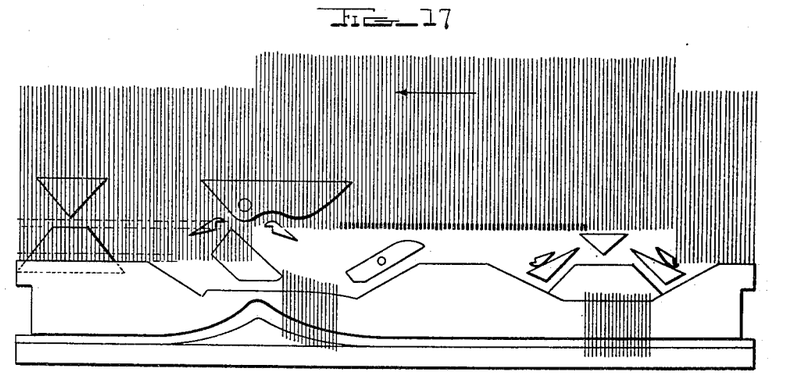
Fig. 17 is a similar view with the widening picks in position for taking down the needles during the heel widening, both the draw and raise cams being shown in inoperative position.
Figure 18:
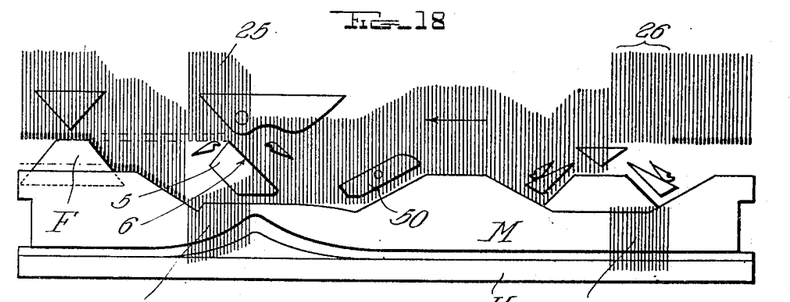
Fig. 18 is a similar view showing the parts in the position for beginning the formation of the toe proper with the raise cam shown in position for elevating the needles at opposite ends of the long butt column which were partially raised by the blocks of jacks, the draw cam being also shown in operative position.
Figure 19:
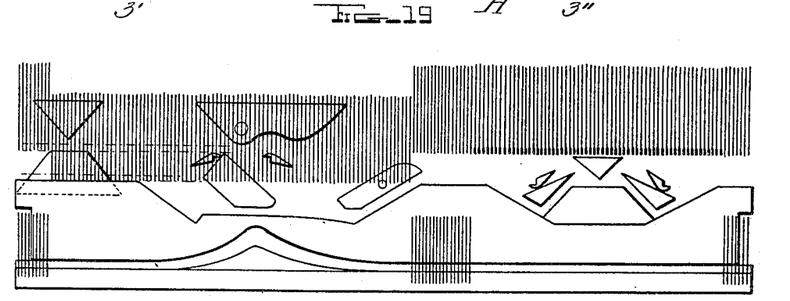
Fig. 19 is a similar view with the parts in position for beginning the narrowing for the toe, the raise and draw cams being shown out of operation: and half of the needles thrown up on the non-working level.

At the narrowing and widening operating it is to be understood that all of the long butt needles, herein shown as one-third of the column, must be temporarily thrown out of action into the non-working level which is a higher level than that of the other needles, the latter continuing in service during this portion of the knitting. Concurrently with the change of movement of the cylinder from continuous circular to reciprocatory rotary knitting the instep cam F is elevated by the movement of the clutch $b'$ to the left and through the horizontal connection $b^3$ jointed to the clutch shipper arm $b'$ whereby all the long butt needles are deflected upwardly by said cam and thrown out of action (see Figs. 15 to 19), the diagram shown in Figs. 15 and 18 showing this cam F operating to raise the long butt needles and the diagrams shown in Figs. 16, 17 and 19 showing them after they have been raised by said cam. When this cam F has been operated to raise the long butt needles the short butt needles, constituting in this instance two-thirds of the entire column, are left standing in the lower or working plane and upon actuation of the cylinder in a rotary reciprocatory movement, the narrowing picks R alternately elevate out of action a short butt needle from each end of this column, the operation being continued until the desired narrowing point is attained.

In the widening operation which commences immediately succeeding the narrowing, each widening pick T throws down two needles alternately from each end of the column of elevated on non-working needles to the normal working plane. The narrowing picks continue in action throughout the widening operations until the completion of the knitting of the heel or toe portion as the case may be and the resumption of circular knitting at which instant all the picks are rendered automatically inoperative.

Figures 7, 10, 11, 12, 13:
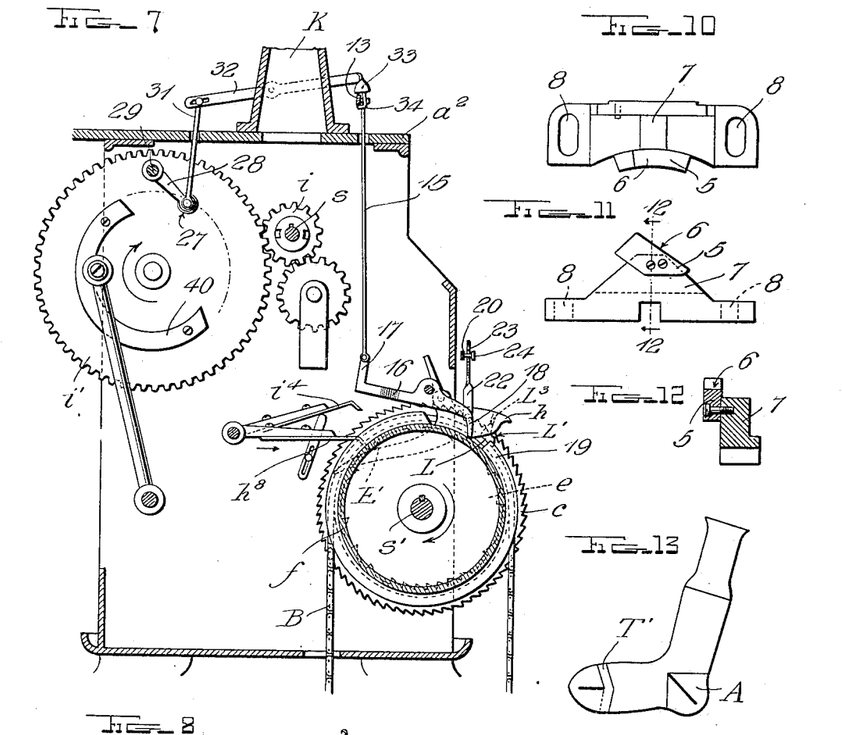
Fig. 7 is a view similar to Fig. 6 with the parts in position ready to be thrown into reciprocatory knitting for the toe.
Figs. 10, 11 and 12 are respectively a plan view, a front elevation and a vertical section of the raise cam used for coöperation with the jacks, the section shown in Fig. 12 being taken on the line 12—12 of Fig. 11.
Fig. 13 is a view showing the article produced by this improved machine.
Figure 8:
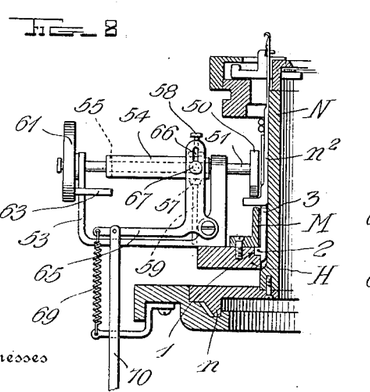
Fig. 8 is a vertical transverse section through one side of the needle cylinder and its connected parts showing the draw cam and its actuating mechanism in side elevation and in position for engagement with the butts of all the needles.

In the half hose shown in Fig. 13 which is the product resulting from the improvements constituting this invention the main object of the invention is accomplished by the formation of a large heel knit on approximately two-thirds of the column of needles which needles are retained on the normal working level when the machine passes from circular to reciprocatory knitting for the heel narrowing and one-third of the column which constitutes all of the long butt needles is thrown out of action at the beginning of this reciprocatory knitting for the narrowing for the heel. After this heel A has been knit in the usual manner by successive narrowing and widening processes all of the needles are thrown into action for the circular knitting to form the foot. When the foot has been completed and the toe is ready to be knit it is obvious that it will be necessary to throw one-half of the needles out of action prior to the narrowing operation in order that the proper number of stitches may be provided for the joints of the toe. To accomplish this raising of the additional needles at the proper time certain automatically controlled cams and jacks or bits are provided for elevating sufficient of the short butt needles on opposite sides of the column of long butt needles which were previously raised by the instep cam F, prior to the positioning of the parts for the narrowing for the toe. These needle raising jacks and the cams for cooperation therewith and the mechanism for operating and controlling them form the subject matter of this invention and they will now be described.

As shown in Figs. 8, and 14 to 19 a cam track 1 is formed in the inner face of the cam plate H at its upper edge, the lower edge of the cam ring M forming the upper wall of said track. This track is designed to receive the lateral studs 2 of needle jacks or bits 3 which travel in said track, said jacks being constructed in the form shown in Fig. 8. This cam track is arranged in the same horizontal plane throughout the greater portion of its length, being upwardly deflected as shown at 4 in Figs. 14 to 19 for a purpose to be described. This deflected portion 4 is preferably of inverted V-shape the sides thereof forming an obtuse angle and in which the studs 2 of the jacks 3 travel and are guided. These jacks 3, any desired number of which may be employed according to the number of needles it is desired to raise at each end of the column of long butt needles, are slidably mounted in the needle grooves of the cylinder N below certain groups of needles and are operable by the deflected portion 4 of the cam track for raising said groups into position to be further elevated by a raise cam 5 to be described, just prior to the narrowing for the toe.

Figure 4:
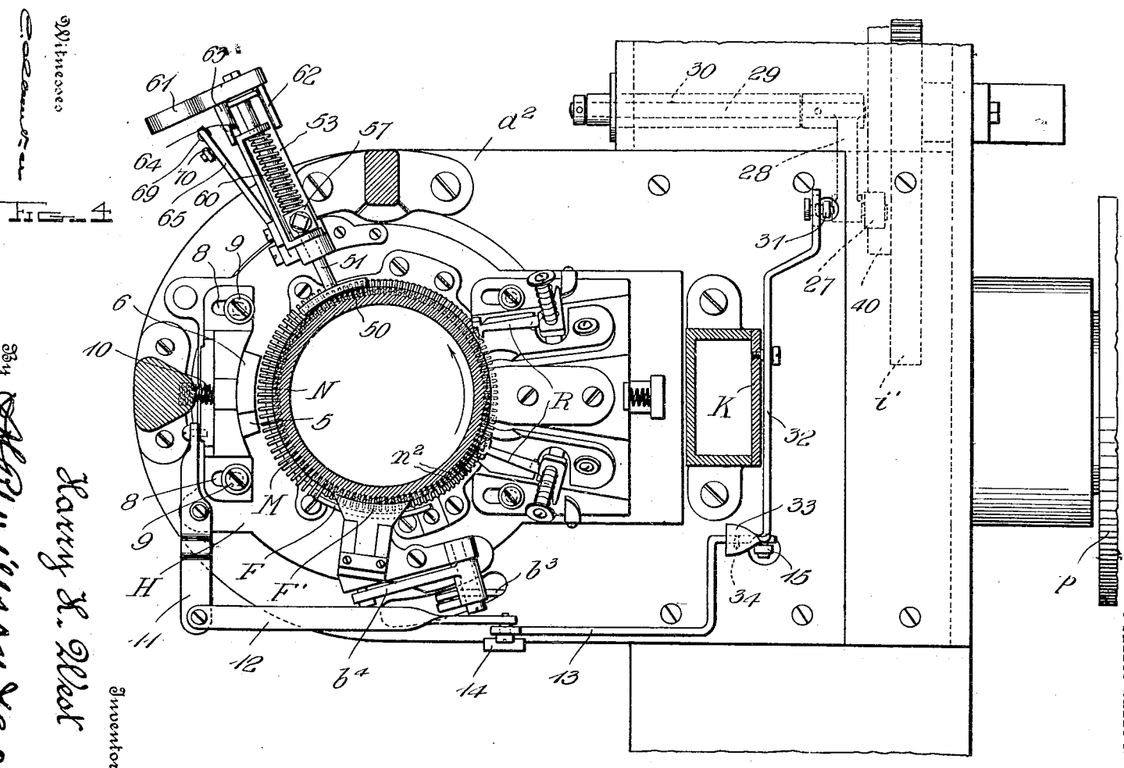
Fig. 4 is a horizontal section through the needle cylinder looking downward.

The raise cam 5, for elevating the groups of needles partially raised by the jacks 3 at opposite ends of the column of long butt needles is preferably constructed as shown in Figs. 4, 10, 11 and 12 having an obliquely disposed working face 6 adapted to be positioned to engage and elevate the jack controlled needles as will be described. The block 7 on which this cam is fixed is mounted on the cam plate H to slide laterally relative to the needle cylinder being here shown slotted transversely at its opposite ends at 8 to receive its securing elements 9 on which it slides laterally toward and away from the needle cylinder. A coiled spring 10 is disposed between the rear face of the block 7 and the bracket which carries the widening picks and exerts its tension to force said cam inward toward the needle cylinder which when in this position operates to engage and raise certain needles which have been partially elevated by the jacks 3. The retracting means here shown for moving said cam 5 away from the cylinder against the tension of the spring 10 comprises a lever 11 fulcrumed intermediate of its ends on the cam plate H to swing in a horizontal plane and which is secured at one end to the cam block 7 and its other end is offset and pivotally connected with one end of a link 12. This link 12 is pivotally connected at its other end with one arm of a bell crank lever 13 which is fulcrumed on an ear 14 on the bed plate. A vertically disposed rod 15 is pivotally connected at its upper end with the free end of the other arm of said bell crank 13 and has its lower end connected with a lever 16 fulcrumed intermediately of its ends on the machine frame. This lever 16 as shown has an upwardly extending heel 17 at its rear end with which the rod 15 is connected and a depending toe 18 at its free end which is frictionally held in engagement with a peripheral cam rib 19 fixed on the drum $f$ carried by the cam shaft $s'$. This cam 19 is shown in the form of a suitably shaped peripheral rib the ends of which are spaced apart and one of them is shown beveled to facilitate the riding up thereon of the lever toe 18. This cam is so disposed as to engage said toe 18 and hold the lever 16 in a horizontal plane with the members connected therewith in the position shown in Figs. 4, 5 and 6 during the knitting of the leg, heel and main portion of the foot of the stocking whereby the cam 5 is held in retracted position out of the path of the needles during these operations as shown in Fig. 4.

It has been found advisable just prior to the finishing of the foot of the stocking to make what is known in the art as "an extended toe" and which consists of a series of circular courses knit with the same yarn employed for knitting the heel and toe proper to provide for the reinforcement or strengthening of the stocking at its portion adjacent the toe proper to receive wear which usually occurs at this point. Concurrently with the throwing in of this yarn for forming the extended toe the cam 19 moves from under the lever toe 18 and unless means be provided for holding this toe up it would obviously be forced at this time into the gap between the ends of the cam 19 by spring 10 and this movement of said toe would through certain connections hereinafter described position a roller 27, also to be described, in the path of a cam 40 on the continuously rotating gear $i'$ and thus cause said roller to move downwardly when the cam 40 passes from under it and to ride up again on said cam 40 once during each revolution of the gear $i'$, four of which revolutions occur in the machine herein shown during the knitting of the sixteen circular courses which constitute the extended toe.

It may be here stated that while sixteen courses are the number usually employed for forming the extended toe, it being understood that four of these courses are knit during one complete revolution of gear $i'$, it is obvious that any desired number may be knit, this being controlled by the position of the double cam L' on the pattern chain.

Hence it will be obvious that on each of these four revolutions of gear $i'$ the roller would be operated to move the cam 5 toward and away from the needle cylinder unless means be provided to hold the toe 18 up during the knitting of these sixteen courses forming the extended toe. The means herein shown for this purpose consists of a bell crank 20 fulcrumed on the machine frame and having a finger 21 extending laterally outward from the free end of one arm thereof and this finger normally extends under the lever 16 adjacent its toe 18 ready to receive and support said toe when the cam 19 moves from under it. A link 22 has a longitudinal slot 23 in one end which is slidably engaged with a stud 24 on the free end of the other arm of the bell crank 20 which arm is shown disposed normally in horizontal position being so held by engagement of its vertical arm with the adjacent face of the lever 16. This link 22 is pivoted to the front or weighted end of the pawl holder $h$ (see Figs. 1, 6 and 7) and is controlled thereby for disengaging the finger 21 from the lever 16 at a predetermined time.

It is obvious that when the weighted end of the pawl holder $h$ is raised the link 22 will move upward without affecting the bell crank 20 until the lower end of this slot 23 engages the stud 24 and the continued raising of the holder $h$ will cause the link 22 to move the stud carrying arm on the bell crank upward and thus move the finger carrying end of the other arm laterally away from the lever 16 thereby releasing said lever and permitting the toe thereof to drop under the tension of the spring 10 into the gap between the ends of the cam 19 as shown in Fig. 7. This movement of the pawl holder is controlled by a double stepped lug L' on the pattern chain B positioned and timed to engage said pawl holder just prior to the shifting of the clutch to throw the machine on reciprocatory knitting for forming the toe. The engagement of the first step $L^2$ of this lug L' with the weighted or front end of the pawl holder moves said holder up a sufficient distance to bring the lower end of slot 23 of link 22 into engagement with the stud 24 of the bell crank 20. The further turning of the feed wheel c brings the second step $L^3$ of the lug L' under the pawl holder as shown in Fig. 7 and lifts it sufficiently to raise the link 22 and move the bell crank 20 to disengage the finger 21 from the lever 16. This lifting of the holder h depresses its rear end sufficiently to expose the tooth E of the wheel e and position it for engagement and adapt it to be engaged by the pawl $h^8$ which, when so engaged turns said wheel a predetermined distance to throw the parts of the machine into position for narrowing for the toe.

When the lever 16 is released from the bell crank 20 the spring 10 exerts its tension to force the cam block 7 inwardly to position the cam 5 against the face of the cylinder and this inward movement of the cam block carries the lever end connected therewith inwardly, moving its outer end outwardly and through the link 12, bell crank 13, and rod 15 elevates the rear end of the lever 16 and forces the toe 18 thereof downwardly into the gap between the ends of the cam 19. This inward movement of the cam 5 takes place just prior to the throwing in of the parts of the machine for reciprocatory motion for narrowing for the toe and which is caused by the turning of the shaft s' through the pawl $h^8$ engaging the tooth E. This cam 5 is then in the position shown in Fig. 18 for engaging and raising the blocks of needles 25 and 26 which have been partially raised by the blocks of jacks 3' and 3" when passing over the deflected portion 4 of the track and by means of which said blocks of needles 25 and 26 are elevated into inoperative position at opposite ends of the column of long butt needles which were previously raised by the instep cam F brought into action by the shifting of the clutch lever b' to the left as shown in Fig. 18 just prior to the narrowing for the toe.

Connected with the lever 16 by means to be described for retracting the raise cam 5 after the columns of needles at the ends of the column of long butt needles have been raised by said cam 5, is a cam controlled roller 27. This roller is mounted on an arm 28 and is positioned adjacent the inner face of the large gear i' and is adapted to be engaged at predetermined periods by a cam 40 secured to the inner face of said gear i'. This arm 28 is fixed to the free end of a shaft 29 which extends through a suitable bearing 30 arranged transversely of the machine. A vertical rod 31 is connected at its lower end to said roller 27 and at its upper end to one end of a lever 32 fulcrumed intermediately of its ends on a hollow standard K secured to the bed plate $a^2$. The other end of this lever has a down turned finger 33 which rests on the upper face of the end of the long arm of the bell crank 13 with which the rod 15 is connected (see Fig. 1) and a depending hook 34 engages said lever 13 to hold said members in operative position against lateral movement.

The cam 40 is secured to the inner face of the continuously rotating gear i' and is shown in the form of a broken ring having beveled ends to facilitate the engagement and disengagement of the roller 27 therewith. This cam 40 as shown extends around about one half of a circle and the roller 27 is dropped into the path thereof between its ends when the toe 18 is moved into the gap between the ends of cam 19 as shown in Fig. 7. This occurs when the cam 5 is forced into position for engaging and raising the columns of short butt needles which have been partially raised by the blocks of jacks 3' and 3". After these needles have been raised and just before the machine goes into the toe knitting the turning of the gear i' causes cam 40 to pass under and raise roller 27 thereby raising the end of lever 32 connected therewith by the rod 31 and lowers the finger carried end of said lever 32 causing its finger 33 to bear down on the long arm of the bell crank 13 and move the short vertical arm thereof forward and the link 12 connected therewith whereby the end of lever 11 connected with the cam block 7 is moved outwardly away from the cylinder N and the cam 5 thus retracted into the position shown in Fig. 4 out of the path of the needles, in which position it is held, until the toe of the next stocking is to be knit, by cam 19 which passes under toe 18 immediately after the roller is raised by cam 40. This engagement of toe 18 by the cam 19 further raises said roller 27 a fraction of an inch just sufficient to cause said roller to clear cam 40 and prevent frictional contact of said roller and cam during the subsequent turning of the gear i'.

A draw cam 50 similar to the cam 11 shown in my Patent No. 1,045,651, is mounted on the cam plate H at one side of the needle cylinder and is adjustable toward and away from said cylinder in a plane at right angles thereto and is adapted to be held in its adjusted position by suitable means to be described. As shown this cam is secured to one end of a rod 51 which is slidably and rotatably mounted in the free ends of a substantially U-shaped bracket 53 secured at one end to the cam plate H and projecting laterally therefrom as is shown clearly in Fig. 8. A slide 54 is mounted on the rod 51 and as shown comprises a bar having laterally extending apertured ears 55 and 56 through which the rod 51 passes. Fixed to said rod between the ends of said slide is an adjustable member 57 held in position by a set screw 58 and having a rod 59 depending therefrom with its free end projected into a longitudinally disposed slot formed in the cross bar of the U-shaped bracket 53 to hold said rod 51 against turning. A coiled spring 60 encircles said rod between the outer end 55 of the slide 54 and said member 57 and the tension of the spring may be varied by moving said member 57 toward or away from the outer end of the slide 54. A gravity pawl 61 is pivotally mounted on the outer end of the rod 51 outside the bracket 53 and is provided on its inner face with laterally projecting spaced stops 62 and 63 which straddle and are adapted to engage the opposite sides of the outer leg of the bracket 53 for limiting the pivotal movement of said pawl in opposite directions. The stop 63 is cut out at the inner edge of its free end to form a catch 64 for engaging the outer face of the upright bracket 53 to lock the pawl in retracted position against the tension of the spring 60. A bell crank lever 65 is fulcrumed to the inner end of the bracket 53 and one arm thereof is pivotally and slidably connected with the inner end of the slide 54 said arm having a longitudinal slot 66 therein which is slidably engaged with a headed stud 67 projecting laterally from said slide 54. The free end of the other arm of said bell crank is resiliently connected with a bracket 68 on the bed plate $a^2$ by means of a coiled spring 69 (see Fig. 8).

Figure 2:
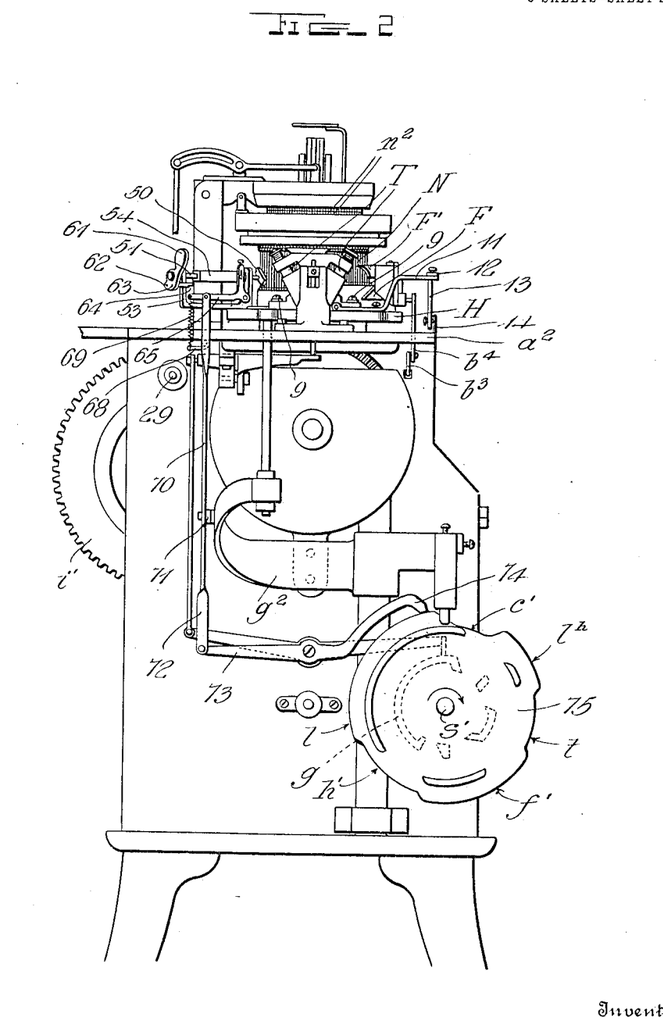
Fig. 2 is an end elevation thereof viewed from the left of the machine.
Figure 3:
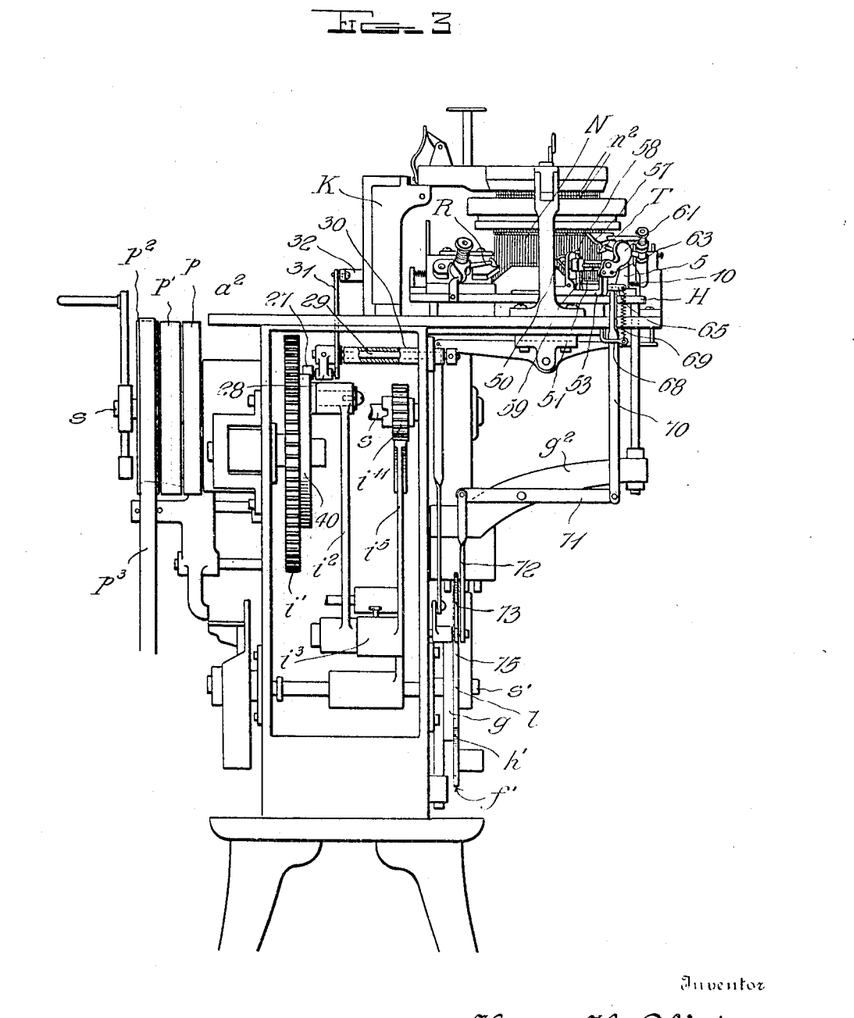
Fig. 3 is a rear elevation with parts broken out and in section.

A bar 70 is pivotally connected at one end with the free end of the horizontal arm of the bell crank 65 and at its other end is pivotally connected with a lever 71 fulcrumed intermediately of its ends on an extension of the arm $g^2$ (see Figs. 2 and 3). A bar 72 connects the other end of said lever 71 with one end of a lever 73 fulcrumed intermediately of its ends on the machine frame and which has an offset toe 74 at its free end which normally bears on the periphery of a mutilated disk 75 fixed to the shaft $s'$ and which is designed to control said lever 73 and through the parts connected therewith the draw cam 50 for moving it toward and away from the needle cylinder N as will be now described. This disk 75 is provided on its periphery with a plurality of cams $l$, $f'$ and $l^h$ having recesses $h'$, $t$, and $c'$ with which the toe or finger 74 of lever 73 is adapted to coöperate, for a purpose to be described.

Figure 9:
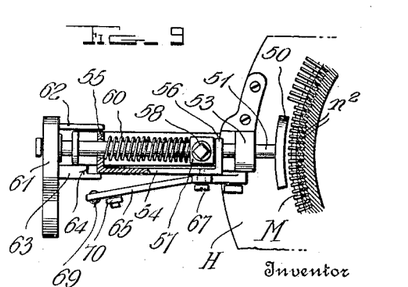
Fig. 9 is a detail plan view of the draw cam attachment showing the cam in position to escape the short butt needles only, a portion of the needle cylinder being shown in horizontal section and a portion of the attachment in horizontal section.

It will thus be observed that the controlling means for the draw cam 50 herein employed, is the same as that shown in Patent 1,045,651 except that the actuating band 7 with its cam 10, bell crank 5, and link 6ª of the patent are dispensed with and the horizontally disposed lever 71, and bars 70 and 72 connected therewith substituted. It will thus be observed that with the parts constructed as shown during the turning of the cam disk 75 under nose 74 of lever 73 the nose 74 will be held in contact with the periphery of disk 75 by the spring 69 operating through bar 70, lever 71 and bar 72 to actuate the draw cam 50 to position it against the cylinder N in the path of all the needles as shown in Figs. 2, 3, 8, 14 and 15 when said nose rides on cam $l$ during the knitting of the stocking leg, and where it remains until the nose 74 drops into recess $h'$ which causes the bar 72, lever 71 and bar 70 to pull down on long arm of bell crank 65 and move rod 51 rearwardly a sufficient distance to retract cam 50 and position it as shown in Figs. 9 and 16 to clear the short butt needles. When disk 75 is turned to bring cam $f'$ under nose 74 the cam 50 is again projected into the position shown in Figs. 8 and 18 where it remains during the knitting of the foot and the extended toe and is adapted to coöperate with cam 5 just before the machine goes on toe and while cam 5 is operating to raise into inoperative position the blocks of needles 25 and 26 elevated by the blocks of jacks 3' and 3", to direct the butts of the succeeding active needles under cam 5 (see Fig. 18). The further turning of disk 75 brings recess $t$ under toe 74 into which said toe drops and causes cam 50 to move away from the cylinder into the position shown in Figs. 9 and 19. When cam $l^h$ passes under toe 74 on the completion of the stocking toe and during the circular knitting for the "loopers' hold" the cam 50 is also positioned against the cylinder the same as for the leg and foot as the cams $l$, $f'$, and $l^h$ are of the same height. After the circular courses forming the "loopers' hold" have been knit, the mechanism is shifted to cause the cam plate H to drop, as is clearly described in the Hemphill patent above referred to, the toe 74 drops into recess $c'$ of the disk 75 whereby the rear end of the lever 73 is raised sufficiently to move cam 50 outward to its extreme limit where it is held by the engagement of the notch 64 with the bracket 53 until released by the operator when the knitting of the next stocking is begun.

Figure 14:
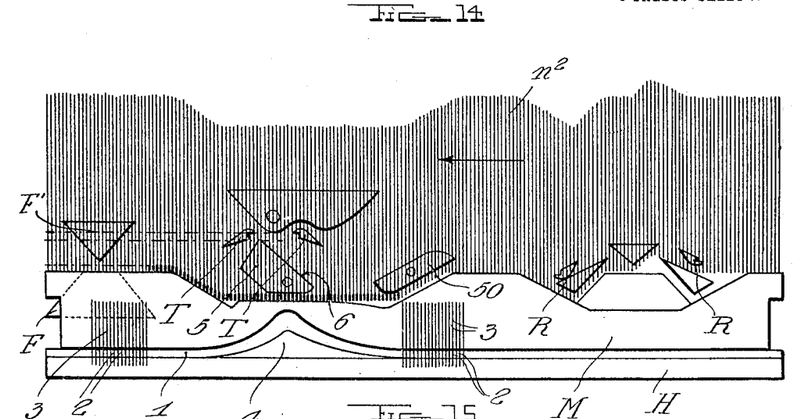
Fig. 14 is a diagram of the inside of the cam cylinder with the needles on the lower working level in the position which is assumed during the circular knitting, the column of needles moving toward the left as shown by the arrow, and the draw cam disposed in operative position.

In the operation of this machine the leg of the stocking is first knit in circular courses in the usual manner the parts being in the position shown in Fig. 14, and at the completion thereof the mechanism of the machine is automatically shifted from circular to reciprocatory movement for the knitting of the heel prior to which all of the long butt needles, constituting one third, more or less, of the entire column are raised into inoperative position as shown in Figs. 15 and 16 by the instep raise cam F which is brought into operation by the shifting of the clutch lever $b'$ to the left. The large heel A is then knit on the remaining two-thirds of the needles by narrowing and widening in the usual manner, Fig. 7 showing the parts in the position which they assume during the heel widening. When this heel is completed the machine shifts automatically onto circular knitting for forming the foot. Near the completion of the foot when the machine slows down prior to the reciprocatory knitting for the toe the yarn used for knitting the heel and toe is thrown in for forming the extended toe T' and just before the machine goes on the toe proper, the instep cam F raises the long butt needles as shown in Fig. 18 and simultaneously the raise cam 5 is thrown into operative position by the releasing of lever 16 from bell crank 20 which occurs after the passing of cam 19 from under the nose 18 of lever 16 and permits said nose to enter the gap between the ends of said cam 19 whereby the spring 10 is released and exerts its action to force cam 5 inward in the position shown in Fig. 18 whereby the inclined working face 6 thereof engages the needle blocks 25 and 26 which have been partially raised by the blocks of jacks 3' and 3'' in their passage through the deflected portion 4 of the cam track 1. This engagement of the needles in blocks 25 and 26 by the cam 5 raises said needles into the non-working level at each end of the column of long butt needles as shown in Fig. 19. After these needles have been raised by cam 5 said cam is retracted in the manner above described by means of the cam 40 passing under and raising roller 27, which roller was lowered into the path of this cam 40 after the cam 19 passed from under toe 18, and said toe had been released from the bell cranks 20. The machine is then thrown onto the reciprocatory knitting for the toe which is knit on the half of the entire column of needles which are left in active position after the cam 5 has been operated. After the toe has been completed the machine is again thrown onto circular knitting for forming the "loopers' hold" courses and when these are knit the completed stocking is pressed off and the cam plate H lowered ready for transferring.

I claim as my invention:

1. In a circular knitting machine, the combination with a revoluble needle cylinder having needles slidable therein, a cam ring encircling said cylinder and having a cam track on its inner face provided with an upwardly deflected portion, blocks of jacks disposed in said needle grooves at predetermined intervals and having lugs traveling in said cam track for raising the needles in the jack carrying grooves at a predetermined point, a spring-pressed cam mounted to move toward and away from said needle cylinder, a lever fulcrumed intermediate of its ends with one end engaging said cam, a link pivoted to the other end of said lever, a bell crank having one arm connected with said link, an upright rod connected with the other arm of said bell crank, a lever fulcrumed intermediately of its ends and connected at one end with said rod, and having a downturned toe at its other end, a revoluble cam positioned under said toe and having a depression at a predetermined point to receive said toe, and a roller connected with said lever, and means for actuating said roller to retract said needle raising cam after it has been projected.

2. In a circular knitting machine, the combination with a revoluble needle cylinder having needles slidable in grooves therein, of means for raising a column of said needles at predetermined intervals, jacks slidably mounted in the grooves of a block of needles disposed adjacent each end of the raised column of needles, a cam movable toward and away from said cylinder for coöperation with said jacks for raising onto the non-working level the needles raised by said jacks, a spring for forcing said cam forward, cam controlled means for holding said first mentioned cam away from said cylinder against the tension of said spring and means for releasing said cam controlled means prior to the narrowing for the toe.

3. In a circular knitting machine, the combination with a revoluble needle cylinder having needles slidable in grooves therein, of means for raising a column of said needles at predetermined intervals, jacks slidably mounted in the grooves of a block of needles disposed adjacent each end of the raised column of needles, a cam movable toward and away from said cylinder for coöperation with said jacks for raising onto the non-working level the needles raised by said jacks, a spring for forcing said cam forward, cam controlled means for holding said first mentioned cam away from said cylinder against the tension of said spring, means for releasing said cam controlled means prior to the narrowing for the toe, and means for holding said cam controlled means for a predetermined interval in inoperative position after it has been released.

4. In a circular knitting machine, the combination with a revoluble needle cylinder having needles slidable in grooves therein, of means for raising a column of said needles at predetermined intervals, jacks slidably mounted in the grooves of a block of needles disposed adjacent each end of the raised column of needles, a cam movable toward and away from said cylinder for coöperation with said jacks for raising onto the non-working level the needles raised by said jacks, a spring for forcing said cam forward, cam controlled means for holding said first mentioned cam away from said cylinder against the tension of said spring and means for releasing said cam controlled means prior to the narrowing for the toe, and a bell crank lever for holding said cam controlled means for a predetermined period in inoperative position after said means has been released.

5. In a circular knitting machine, the combination with a revoluble needle cylinder having needles slidable in grooves therein, of means for raising a column of said needles at predetermined intervals, jacks slidably mounted in the grooves of a block of needles disposed adjacent each end of the raised column of needles, a cam movable toward and away from said cylinder for coöperation with said jacks for raising onto the non-working level the needles raised by said jacks, a spring for forcing said cam forward, a lever connected with said first mentioned cam and having a depending nose, a cam rib having a recess therein and positioned in the path of said lever nose and with which said nose contacts, means controlled by said spring for forcing said nose into said recess at a predetermined time on the passage of said cam rib from under said nose.

6. In a circular knitting machine, the combination with a revoluble needle cylinder having needles slidable in grooves therein, of means for raising a column of said needles at predetermined intervals, jacks slidably mounted in the grooves of a block of needles disposed adjacent each end of the raised column of needles, a cam movable toward and away from said cylinder for coöperation with said jacks for raising onto the non-working level the needles raised by said jacks, a spring for forcing said cam forward, a lever connected with said first mentioned cam and having a depending nose, a cam rib having a recess therein and positioned in the path of said lever nose and with which said nose contacts, means controlled by said spring for forcing said nose into said recess at a predetermined time on the passage of said cam rib from under said nose, and means for holding said nose a predetermined interval out of said recess after said cam rib has passed from under it.

7. In a circular knitting machine, the combination with a revoluble needle cylinder having needles slidable in grooves therein, of means for raising a column of said needles at predetermined intervals, jacks slidably mounted in the grooves of a block of needles disposed adjacent each end of the raised column of needles, a cam movable toward and away from said cylinder for coöperation with said jacks for raising onto the non-working level the needles raised by said jacks, a spring for forcing said cam forward, a lever connected with said first mentioned cam and having a depending nose, a cam rib having a recess and positioned in the path of said lever nose with which said nose is pressed in contact, means controlled by said spring for forcing said nose into said recess at a predetermined time on the passage of said cam rib from under said nose, means for holding said nose a predetermined interval out of said recess after said cam rib has passed from under it, a pattern chain, and a lug on the pattern chain for releasing said nose holding means just prior to the narrowing for the toe.

8. In a circular knitting machine, the combination with a revoluble needle cylinder having needles slidable in grooves therein, of means for raising a column of said needles at predetermined intervals, jacks slidably mounted in the grooves of a block of needles disposed adjacent each end of the raised column of needles, a cam movable toward and away from said cylinder for coöperation with said jacks for raising onto the non-working level the needles raised by said jacks, a spring for forcing said cam forward, a lever connected with said first mentioned cam and having a depending nose, a cam rib having a recess and positioned in the path of said lever nose with which said nose is pressed in contact, means controlled by said spring for forcing said nose into said recess at a predetermined time on the passage of said cam rib from under said nose, a bell crank having a finger on one arm extending under said lever for holding said nose out of said recess after said cam rib has passed from under it, and means for releasing said bell crank just prior to the narrowing for the toe.

9. In a circular knitting machine, the combination with a revoluble needle cylinder having needles slidable in grooves therein, of means for raising a column of said needles at predetermined intervals, jacks slidably mounted in the grooves of a block of needles disposed adjacent each end of the raised column of needles, a cam movable toward and away from said cylinder for coöperation with said jacks for raising onto the non-working level the needles raised by said jacks, a spring for forcing said cam forward, a lever connected with said first mentioned cam and having a depending nose, a cam rib having a recess and positioned in the path of said lever nose with which said nose is pressed in contact, means controlled by said spring for forcing said nose into said recess at a predetermined time on the passage of said cam rib from under said nose, a bell crank having a finger on one arm extending under said lever for holding said nose out of said recess after said cam rib has passed from under it, means for releasing said bell crank just prior to the narrowing for the toe, a link for disengaging said bell crank from said lever, said link and the other arm of said bell crank having coöperating means for disengaging said finger from said lever at a predetermined time.

10. In a circular knitting machine, the combination with a revoluble needle cylinder having needles slidable in grooves therein, of means for raising a column of said needles at predetermined intervals, jacks slidably mounted in the grooves of a block of needles disposed adjacent each end of the raised column of needles, a cam movable toward and away from said cylinder for coöperation with said jacks for raising onto the non-working level the needles raised by said jacks, a spring for forcing said cam forward, a lever connected with said first mentioned cam and having a depending nose, a cam rib having a recess and positioned in the path of said lever nose with which said nose is pressed in contact, means controlled by said spring for forcing said nose into said recess at a predetermined time on the passage of said cam rib from under said nose, a bell crank having a finger on one arm extending under said lever for holding said nose out of said recess after said cam rib has passed from under it, and means for releasing said bell crank just prior to the narrowing for the toe, a link for disengaging said bell crank from said lever, said link having a slot extending longitudinally thereof, a stud on the other arm of said bell crank slidably engaged with said slot in the link, and means for raising said link to release said lever.

11. In a circular knitting machine, the combination with a revoluble needle cylinder having needles slidable in grooves therein, of means for raising a column of said needles at predetermined intervals, jacks slidably mounted in the grooves of a block of needles disposed adjacent each end of the raised column of needles, a cam movable toward and away from said cylinder for coöperation with said jacks for raising onto the non-working level of needles raised by said jacks, a spring for forcing said cam forward, cam controlled means for holding said first mentioned cam away from said cylinder against the tension of said spring, means for releasing said cam controlled means prior to the narrowing for the toe, and cam controlled means for retracting said first mentioned cam against the tension of said spring.

12. In a circular knitting machine, the combination with a revoluble needle cylinder having needles slidable in grooves therein, of means for raising a column of said needles at predetermined intervals, jacks slidably mounted in the grooves of a block of needles disposed adjacent each end of the raised column of needles, a cam movable toward and away from said cylinder for coöperation with said jacks for raising onto the non-working level of needles raised by said jacks, a spring for forcing said cam forward, cam controlled means for holding said first mentioned cam away from said cylinder against the tension of said spring, means for releasing said cam controlled means prior to the narrowing for the toe, and cam controlled means for retracting said first mentioned cam against the tension of said spring positioned for actuation by its cam on the lowering of said lever nose into said recess.

13. In a circular knitting machine, the combination with a revoluble needle cylinder having needles slidable in grooves therein, of means for raising a column of said needles at predetermined intervals, jacks slidably mounted in the grooves of a block of needles disposed adjacent each end of the raised column of needles, a cam movable toward and away from said cylinder for coöperation with said jacks for raising onto the non-working level of needles raised by said jacks, a spring for forcing said cam forward, cam controlled means for holding said first mentioned cam away from said cylinder against the tension of said spring, means for releasing said cam controlled means prior to the narrowing for the toe, a cam controlled roller for retracting said first mentioned cam against the tension of said spring, said roller being connected with said lever and adapted to be positioned for actuation by its cam on the lowering of said lever nose into said recess.

14. In a circular knitting machine, the combination with a revoluble needle cylinder having needles slidable in grooves therein, of means for raising a column of said needles at predetermined intervals, jacks slidably mounted in the grooves of a block of needles disposed adjacent each end of the raised column of needles, a cam movable toward and away from said cylinder for coöperation with said jacks for raising onto the non-working level of needles raised by said jacks, a spring for forcing said cam forward, cam controlled means for holding said first mentioned cam away from said cylinder against the tension of said spring, means for releasing said cam controlled means prior to the narrowing for the toe, and means for retracting said first mentioned cam against the tension of said spring comprising a continuously rotating gear, a cam rib on one face of said gear, a roller arranged adjacent said gear face and adapted to be positioned in the path of the cam on said gear, a lever fulcrumed intermediate of its ends, a rod connecting one end of said lever with said roller, the other end of said roller being positioned to operate the mechanism of said first mentioned cam for retracting said cam against the tension of said spring when said roller is elevated by the cam on said gear.

In testimony whereof I have hereunto set my hand in presence of two subscribing witnesses.

HARRY H. WEST.

Witnesses:
J. HOWARD SMITH,
EMMA HEDDEN.

Copies of this patent may be obtained for five cents each, by addressing the "Commissioner of Patents, Washington, D. C."